United States Patent
Berlovan et al.

[11] Patent Number: 6,014,306
[45] Date of Patent: Jan. 11, 2000

[54] ELECTRICAL DEVICE WITH WEDGE INSERT GAS SEAL FOR PROBE

[75] Inventors: Viorel Berlovan, Medina; John D. Sakich, Wadsworth, both of Ohio; Hatim H. Taj, Columbia, Mo.

[73] Assignee: Hubbell Incorporated, Orange, Conn.

[21] Appl. No.: 09/159,774

[22] Filed: Sep. 24, 1998

[51] Int. Cl.⁷ ........................................... H02H 9/04
[52] U.S. Cl. ........................... 361/127; 361/118; 361/132
[58] Field of Search ...................... 361/117, 126, 361/127, 128, 131, 132, 124, 125, 120, 123, 130, 118, 138

[56] References Cited

U.S. PATENT DOCUMENTS

| | | |
|---|---|---|
| 2,548,112 | 4/1951 | Kaminky . |
| 3,184,634 | 5/1965 | Kershaw, Jr. . |
| 3,727,108 | 4/1973 | Westrom . |
| 3,915,534 | 10/1975 | Yonkers . |
| 4,029,380 | 6/1977 | Yonkers . |
| 4,161,012 | 7/1979 | Cunningham . |
| 4,352,139 | 9/1982 | Du Pont et al. . |
| 4,404,614 | 9/1983 | Koch et al. . |
| 4,456,942 | 6/1984 | Bronikowski . |
| 4,825,188 | 4/1989 | Parraud et al. . |
| 4,851,955 | 7/1989 | Doone et al. . |
| 4,864,456 | 9/1989 | Thuillier et al. . |
| 4,930,039 | 5/1990 | Woodworth et al. . |
| 5,043,838 | 8/1991 | Sakich . |
| 5,047,891 | 9/1991 | Nedriga . |
| 5,050,032 | 9/1991 | Thevenet et al. . |
| 5,088,001 | 2/1992 | Yaworski et al. . |
| 5,128,824 | 7/1992 | Yaworski et al. . |
| 5,138,517 | 8/1992 | Raudabaugh . |
| 5,210,676 | 5/1993 | Mashikian . |
| 5,309,313 | 5/1994 | Yaworski et al. . |
| 5,363,266 | 11/1994 | Wisemann et al. . |
| 5,497,138 | 3/1996 | Malpiece et al. . |
| 5,574,613 | 11/1996 | Shirakawa et al. . |
| 5,625,523 | 4/1997 | Nedriga . |

FOREIGN PATENT DOCUMENTS

| | | |
|---|---|---|
| 0 008 181 | 2/1980 | European Pat. Off. . |
| 0 033 420 | 8/1981 | European Pat. Off. . |
| 0 033 804 | 8/1981 | European Pat. Off. . |

*Primary Examiner*—Jeffrey Gaffin
*Assistant Examiner*—Kim Huynh
*Attorney, Agent, or Firm*—Jerry M. Presson; Mark S. Bicks

[57] ABSTRACT

An electrical device has a housing with an internal cavity lined with insulating material. An electrical component is mounted in the cavity between the opposite ends of the housing. An electrically conductive probe is mounted in the cavity at one housing end. An end connector is mounted in the cavity at another housing end. The electrical component is electrically connected to the end connector and to the probe. The electrical component connection to the probe includes wedge insert engaging the component inner end and engaging an inner surface of the lining of insulating material to form a seal between them. Gas generated by the electrical component will not flow past the wedge insert in the direction of the probe.

22 Claims, 1 Drawing Sheet

ELECTRICAL DEVICE WITH WEDGE INSERT GAS SEAL FOR PROBE

FIELD OF THE INVENTION

The present invention relates to an electrical device with a probe and electrical components mounted in two distinct parts of housing. The two housing parts are sealed from one another by a wedge insert, whereby gas generated by the electrical components cannot flow past the wedge insert in the direction of the probe.

BACKGROUND OF THE INVENTION

Conventional elbow surge arresters have two substantially perpendicularly oriented legs, with one leg housing a probe and another leg housing a plurality of metal oxide varistor blocks. Typical surge arresters of this type are disclosed in U.S. Pat. No. 4,161,012 to Cunningham, U.S. Pat. No. 5,088,001 to Yaworski, U.S. Pat. No. 5,128,824 to Yaworski, U.S. Pat. No. 5,309,313 to Yaworski, and published European patent application Ser. No. 0 033 804.

In these conventional elbow arresters, gas generated from the varistor blocks will flow into the area of the probe during fault conditions. The build up of gas pressure in the probe area can cause disconnection of the elbow arrester from the bushing to which it is connected.

SUMMARY OF THE INVENTION

An object of the present invention is to provide an elbow arrester having a housing in which the electrical component area is separated from the probe area by a gas type seal to prevent gas generated in the electrical component from entering the probe area and disconnecting the probe from its connection.

Another object of the present invention is to provide an electrical device having a wedge shaped insert wedged in the interior of the hollow installation of the housing between the electrical component and a probe to provide a gas-tight seal therebetween air.

A further object of the present invention is to provide an elbow surge arrester having a gas-tight seal between its varistor blocks and its probe, preventing gas from entering the probe area.

A still further object of the present invention is to provide an electrical device or an elbow surge arrester that is simple to manufacture, and provides a highly reliable and secure connection at the probe.

The foregoing objects are basically obtained by an electrical device comprising a housing, an electrical component mounted in an internal cavity of the housing between its opposite ends, and an electrically conductive probe mounted in the housing cavity at a first of its ends. An end connector is mounted in the cavity at its second end. A first connector electrically couples the end connector to an outer end of the electrical component. A second connector electrically couples the probe to an inner end of the electrical component. The second connector includes a wedge insert engaging the electrical component inner end, forming a electrical connection therebetween and engaging an inner surface of the insulating material of the housing forming a seal therebetween.

By forming the electrical device in this manner, gas generated by the electrical component cannot flow past the wedge insert in a direction toward the probe. Since gas cannot flow pass into the probe area, gas pressure cannot build up around the probe, which gas pressure would tend to cause disengagement of the probe from its electrical connection for example, with a bushing. Such gas is often developed when the arrester is subjected to fault conditions.

Other objects, advantages and salient features of the present will become apparent from the following detailed description, which, taken in conjunction with the annexed drawings, discloses preferred embodiments of the invention.

BRIEF DESCRIPTION OF THE DRAWINGS

Referring to the drawings which form a part of this disclosure.

DETAILED DESCRIPTION OF THE INVENTION

Figure 1:
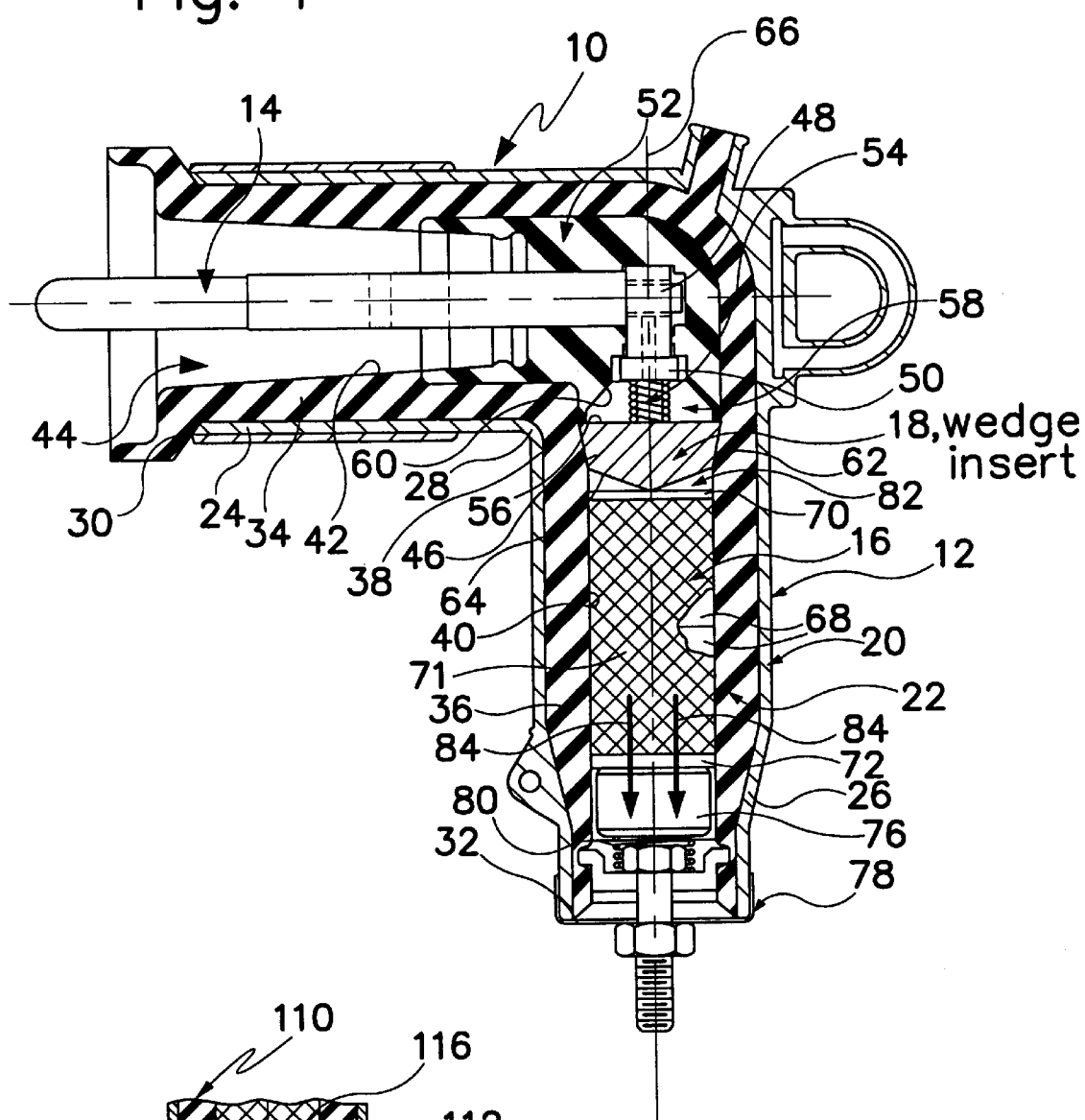
FIG. 1 is a side elevational view in section of an elbow surge arrester according to a first embodiment the present invention.
Figure 2:
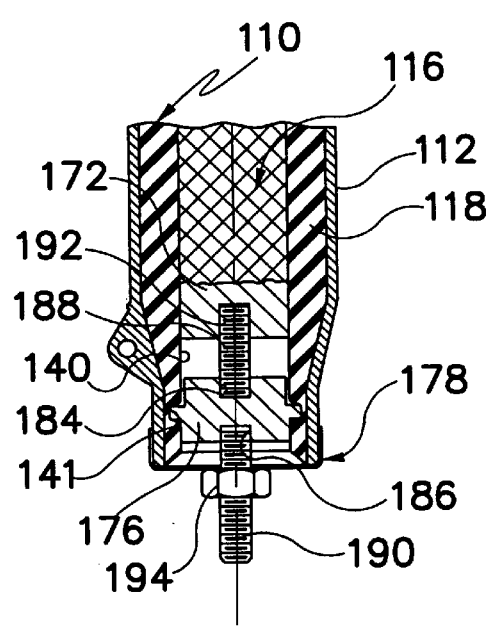
FIG. 2 is a partial, side elevational view of a surge arrester according to a second embodiment of the present invention.

Referring initially to the first embodiment of the present invention illustrated in FIG. 1, elbow surge arrester 10 comprises a housing 12 which receives an electrically conductive probe 14 and an electrical component or module 16 in two separate areas of the housing. These two areas are separated by a wedge insert 18 which forms an electrical connection between probe 14 and component 16 and provides a gas-tight seal preventing gas generated by the electrical components from passing into the area of the probe 14.

Housing 12 is of generally conventional construction, and comprises an electrically conductive outer jacket 20 and a lining 22 of insulating rubber. Jacket 20 has a first leg 24 and a second leg 26 oriented substantially perpendicular to one another and connected at a junction 28. The jacket defines an internal cavity with openings 30 and 32 on its opposite ends.

Lining 22 covers the entire inner surface of jacket 20 forming its internal cavity, and thus, is also formed with a first leg 34 and a second leg 36. The lining legs are coupled at a junction 38. The lining extends from second opening 32 to and beyond first opening 30. The hollow interior of the lining defines internal passageways through the perpendicularly oriented legs 34 and 36 and the connecting junction 38. Passageway 40 in second leg 36 receives electrical component 16. Passageway 42 in first leg 34 receives probe 14. The portion of the lining defining passageway 42 adjacent first opening 30 is laterally spaced from probe 14 to provide an open probe area 44 for receiving a connecting bushing in a conventional manner. Passageways 40 and 42 meet at a junction adjacent lining junction 38. Passageway 40, at its end adjacent lining junction 38, has a frustoconical-shape section 46 tapering toward jacket opening 32.

Probe 14, at its end adjacent jacket junction 28 and lining junction 38, has a probe connector 48. Probe connector has one end coupled to probe 14 and a base portion 50 at its opposite end. The inner end portion of probe 14, adjacent to junctions 28 and 38, and probe connector 48 are encased in a conductive rubber insert 52. Conductive rubber insert 52, with probe 14 and probe connector 48 fill the junction of passageways 40 and 42. Base portion 50 is exposed in an end portion of conductive rubber insert 52 facing passageway 40.

A compression spring 54 is compressed between and engages an end surface of probe connector base portion 50 and a flat upper surface 56 of wedge insert 18. The spring is housed in a free air volume 58. The free air volume is defined between wedge insert 18 and a recess 60 formed in conductive rubber insert 52, and is for evacuation of the electrical component 16.

Wedge insert 18 is formed of conductive material. With compression spring 58, the wedge insert provides an electrical connection between probe 14 and electrical component 16. From its upper surface 56, insert 18 has a laterally tapered surface 62 and a bottom tapered surface 64 in sequence. Surface 62 is only at a slight angle to second leg axis 66, while surface 64 is at a significantly greater angle to that axis. The tapering of surface 62 and of passageway section 46 correspond, and with the dimensions thereof, provide an interference fit between the wedge insert and the lining to form a gas-tight seal therebetween. Bottom tapered surface 64 engages electrical component 16 for electrical connection therebetween.

Electrical component 16 preferably comprises a module formed of plurality of metal oxide varistor blocks 68 arranged in a column. The opposite ends of the column of varistor blocks are formed by end terminals 70 and 72. The end terminals and varistor blocks are secured together in axial compression by being encapsulated in a fiberglass wrap to form the electrical component or module 16. The specific form of the module can be constructed according to the teachings of U.S. Pat. No. 5,138,517 to Raudabaugh, or U.S. Pat. Nos. 4,905,118 or 5,043,838 to Sakich, the subject matter of each of which is hereby incorporated by reference.

The exposed end surface of end terminal 72 is connected to a connector 76 which is electrically conductive. Connector 76 is electrically coupled to an end connector 78 by a compression spring 80, as conventional in elbow surge arresters. Thus, such features are not described in further detail.

Electrical component or module 16 is mounted between wedge insert 18 and connector 78. A free air volume 82 is provided between the wedge insert and module 16.

Compression spring 80 releasably couples the module to the end connector. Upon disengagement of the end connector from housing 12, the module will remain in the housing.

In operation of the first embodiment, gases are generated by the varistor blocks in module 16. The wedging of insert in section 46 of passageway 40 prevents gas from entering probe area 44, and directs and increases the gas flow in the direction of the end connector or ground disconnect 78. In this manner, the gas passes in the direction indicated by arrows 84.

The gas cannot pass beyond conductive rubber insert 52 and into the probe area. If gas were to be allowed to enter the probe area, gas pressure could tend to build up in that area forcing the probe 14 from its connection.

Arrester 110 according to the second embodiment of the present invention differs from the first embodiment solely in the connection of its module 116 to end connector 178 within housing 112 and lining 118. A connector 176 is mounted within passageway 140. Connector 176 has a laterally extending peripheral flange 177 that is received releasably in a corresponding recess 141 in the lining.

The opposite surfaces of connector 176 are provided with tapped holes 184 and 186 which threadedly engage bolts 188 and 190, respectively. Bolt 188 is also threadedly engaged within a tapped bore 192 in end terminal 172 of module 16. A nut 194 threadedly engaged on bolt 190 and engaged with the outer surface of end connector 178 provides a positive engagement between the bolt and the end connector. Moreover, bolt 190, connector 178, bolt 188, tapped bore 192 and end terminal 172 provide a rigid connection between module 116 and the end connector.

In operation of the second embodiment, upon achieving fault conditions, the end connector will become disengaged from the housing and lining. With the gas emitted by the varistor blocks in module 116 upon experiencing fault conditions, the module will be forceably ejected from the housing and lining along with the disengagement of the end connector. The module will remained connected to the end connector even after the full current it provides a consistent failure mode.

While various embodiments have been chosen illustrate the invention, it will be understood by those skilled in the art that various changes and modifications can be made therein without departing from the scope of the invention as defined appended claims.

What is claimed is:

1. An electrical device, comprising;
    a housing having an internal cavity lined with insulating material and opening on first and second ends of said housing;
    an electrical component with inner and outer ends mounted in said cavity between said first and second ends;
    an electrically conductive probe mounted in said cavity at said first end;
    an end connector mounted in said cavity at said second end;
    a first connector electrically coupling said end connector to said outer end of said electrical component; and
    a second connector electrically coupling said probe to said electrical component, said second connector including component a wedge insert engaging said inner end of said electrical component forming an electrical connection therebetween and engaging an inner surface of said insulating material forming a seal therebetween;
    whereby gas generated by said electrical component cannot flow past said wedge insert in a direction of said probe.

2. An electrical device according to claim 1 wherein
    said insulating material comprises a passageway section adjacent said wedge insert, said passageway section tapering toward said electrical components and engaging said wedge insert with an interference fit.

3. An electrical device according to claim 1 wherein
    a free air volume is between said wedge insert and said electrical component.

4. A electrical device according to claim 1 wherein
    said wedge insert tapers toward said electrical component.

5. An electrical device according to claim 1 wherein
    said housing is an elbow with first and second legs oriented substantially perpendicularly to one another.

6. An electrical device according to claim 5 wherein
    said probe extends coaxially in said first leg; and
    said wedge insert and said electrical component extend coaxially in said second leg.

7. An electrical device according to claim 1 wherein
    an end of said probe adjacent said first connector is encased in a conductive rubber insert.

8. An electrical connector according to claim 1 wherein
    said electrical component comprises metal oxide varistor blocks.

9. An electrical arrester according to claim 8 wherein
    said metal oxide varistor blocks are encapsulated in a fiberglass wrap to form a module.

10. An electrical device according to claim 9 wherein said first connector comprises a threaded rod rigidly connecting said module to said end connector.

11. An electrical device according to claim 1 wherein said first connector comprises a compression spring releasable coupling said electrical component to said end connector.

12. An electrical device according to claim 1 wherein said second connector comprises a compression spring engaging said probe and said wedge insert.

13. An electrical device according to claim 12 wherein a conductive rubber insert encases an end of said probe adjacent said second connector, and has a recess therein receiving said compression spring and defining free air volume.

14. An elbow surge arrester, comprising:

an electrically conductive housing having first and second legs oriented substantially perpendicular to one another, and having an internal cavity and first and second openings on opposite ends thereof;

a lining of insulating material mounted within said housing and covering said internal cavity between said first and second ends, said lining defining an internal passageway therethrough having first and second legs oriented substantially perpendicular to one another and having a juncture between said legs thereof, said passageway having a section in said second leg of said lining adjacent said juncture and tapering toward said second end;

a plurality of varistor blocks aligned in a column in said second leg of said lining, said column having inner and outer ends;

an end connector mounted in said housing adjacent said second end thereof;

a first connector electrically coupling said end connector to said outer end of said column of said varistor blocks; and a second connector electrically coupling said probe to an adjacent end of said column of varistor blocks, said second connector including a wedge insert tapering toward and engaging said inner end of said column, said wedge insert being received in said section of said passageway with an interference fit to form a gas-tight seal therebetween.

15. An elbow surge arrester according to claim 14 wherein a free air volume is between said wedge insert and said varistor blocks.

16. An elbow surge arrester according to claim 14 wherein an end of said probe adjacent said first connector is encased in a conductive rubber insert.

17. An elbow surge arrester according to claim 14 wherein said varistor blocks are metal oxide varistor blocks.

18. An elbow surge arrester according to claim 14 wherein said varistor blocks are encapsulated in fiberglass wrap to form a module.

19. An elbow surge arrester according to claim 14 wherein said first connector comprises a threaded rod rigidly connecting said column to said end connector.

20. An elbow surge arrester according to a claim 14 wherein said first connector comprises a compression spring releasably coupling said column to said end connector.

21. An elbow surge arrester according to claim 14 wherein said second connector comprises a compression spring engaging said probe and said w edge insert.

22. An elbow surge arrester according to claim 21 wherein a conductive rubber encases an end of said probe adjacent said second connector, and has a recess therein receiving said compression spacing and defining a free air volume.

* * * * *